Nov. 19, 1968  S. FRANKEL  3,411,333
ROLLING MILL DEVICE

Filed Nov. 22, 1965  2 Sheets-Sheet 1

INVENTOR.
SYDNEY FRANKEL
BY
ATTORNEY

Nov. 19, 1968  S. FRANKEL  3,411,333
ROLLING MILL DEVICE

Filed Nov. 22, 1965  2 Sheets-Sheet 2

INVENTOR.
SYDNEY FRANKEL
BY
ATTORNEY

United States Patent Office 3,411,333
Patented Nov. 19, 1968

3,411,333
ROLLING MILL DEVICE
Sydney Frankel, 318 Briarcliffe Road,
West Englewood, N.J. 07666
Filed Nov. 22, 1965, Ser. No. 509,057
5 Claims. (Cl. 72—45)

ABSTRACT OF THE DISCLOSURE

The invention relates to a rolling device for rolling sheets or strips such as metals, plastics, paper, laminates, etc., in which at least one roller which contacts the sheet or similar material being rolled comprises a stationary core and a rotatable sleeve, the core containing passageways for the introduction of a high viscosity lubricant into the space between the core and the sleeve.

---

This invention relates to an improved apparatus for rolling sheets and strips of materials such as metals, papers, plastic, laminates, etc.

Among the objects of the invention is to provide a pair of mill rolls adapted to operate to roll sheets therebetween to close tolerances.

Among other objects of the invention is to provide a pair of mill rolls for which the pressure and/or distance therebetween can be adjusted within certain limits without repositioning the bearing support for the same.

Among other objects of the invention is to provide a mill roll with an improved type of floating sleeve surface.

These and other objects and advantages of the invention are attained by constructing at least one of the mill rolls as an outer sleeve which is rotatable on a stationary shaft having means to supply highly viscous lubricant under pressure between said shaft and said sleeve so that said sleeve rotates on the film of lubricant free of metal-to-metal contact with the shaft.

The term "lubricant" is used in its broad sense. Greases are ordinarily employed for high viscosity lubricants but other highly viscous and/or thixotropic liquids may be employed in place of greases. Just as air and aqueous liquids are common lubricants for fluid bearings utilizing fluids of low viscosity, it will be recognized that many highly viscous liquids with relatively low internal friction may be substituted for greases as the high viscosity lubricant of the present invention.

Several advantages of high viscosity lubricants for fluid type bearings have already been described including, (1) for a given value of thickness and of load (pressure), the power required to operate a hydrostatic bearing decreases as the viscosity increases, and (2) for a given value of film thickness and of input power, the load a given bearing can carry increases as the square root of the increase in viscosity of the lubricant. In applying the principle of fluid lubrication to a sleeve according to the present invention, advantage is taken of still another property of highly viscous lubricants, namely that highly viscous lubricants develop a pressure differential between the region of application, and the regions at a distance from the region of application so that in use the highly viscous lubricant is under high pressure in the regions where the lubricant supports the sleeve whereas the lubricant is under substantially reduced pressure when it reaches regions where it can leak from between the shaft and the sleeve.

The same property of highly viscous lubricants of developing pressure differentials between the region of application of the lubricant under pressure and the remote regions (where the lubricant might leak for example), enables one to vary the approach of the sleeve device of the invention to the surface of its mating roll (which may be a conventional roll or a duplicate sleeve type of roll) by varying the pressure applied to the highly viscous lubricant. The variation in distance is relatively small for one such sleeve device but in preparing thin sheets it is important to be able to make the final fine adjustments to obtain close tolerances in the finished strip material. The adjustment distance can be increased by making both of a pair of pressure rolls of the sleeve type disclosed herein.

Again, the same property of highly viscous lubricants of developing pressure differentials enables one to apply differential pressures along the length of the sleeve, as long as such pressures are balanced. Thus a tendency for the sleeve to be depressed in the center portion can be balanced or the sleeve can be caused to bulge slightly in annular regions along the length thereof. The balancing of the annular regions where higher pressure is applied can be internal by positioning the annular regions (where additional pressure is to be applied) symmetrically with respect to the center of the sleeve or roll, or, balancing may be obtained externally by applying additional counter-pressure to the high pressure region from the mating roll, for example.

Other and more detailed objects and advantages of the present invention will become apparent from the following specifications and appended claims when taken in connection with the accompanying drawings in which:

Figure 1:
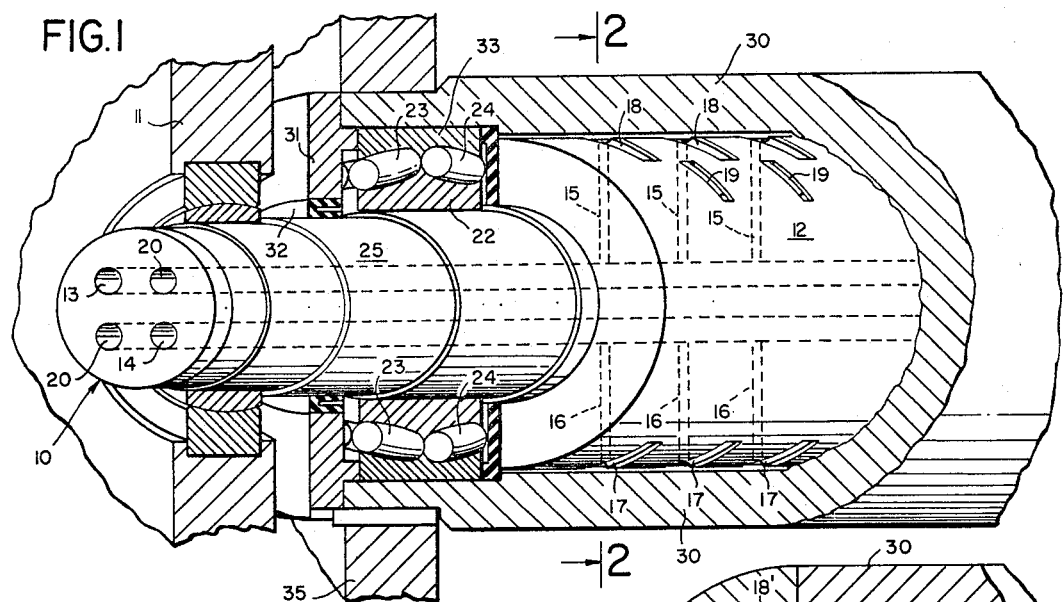
FIG. 1 is a view, partly in section, of one end of a roll formed according to the invention.

The stationary core or shaft 10 of FIG. 1 is non-rotatably supported in the pillow block or stock 11 of the frame. The cylindrical, central portion 12 of the core 10 is enlarged as shown. Inlet ports 13, 14 extend about half way through the core 10 and connect with radial ports 15, 16, the radial ports 15, 16 ending in slots 17, 18. Additional slots 19 collect oil and direct it to outlet ports 20 through radial ports 21 (see FIG. 2) similar to ports 15, 16. Affixed to the core 10 adjacent to the ends of enlarged cylindrical portions 12 is a bearing course 22, in which rotate the roller bearings 23, 24. Ports similar to 13, 14, and 20 extend inward from the opposite end of the core 10.

The rotatable sleeve 30 surrounds the enlarged cylindrical portion 12 of core 10 and extends beyond said enlarged cylindrical portion. The ends 31 of the sleeve 30 are flanged inwardly to fit about the adjacent portion 25 of core 10 and provide a space for an elastic or plastic seal 32 between said stationary core and the rotating sleeve. Affixed to the interior of the sleeve 30 beyond the limits of enlarged portion 12 of the core is the bearing course 33 adapted to cooperate with roller bearings 23, 24, etc. A second elastic or plastic sealing means 34 in the form of a toroidal disk is fitted between the bearings 22, 23, 24, 33 and the enlarged cylindrical portion 12. Fitted over the outer end portion of the sleeve 30 is a suitable drive means 35 for said sleeve which may be a gear or a pulley.

The opposite end of the roll may be mounted in the same way, although in some cases a second drive means 35 may not be necessary. It will be understood that when the roll is being operated as part of a roll pair to exert pressure on strip material passing over the sleeve 30 only a relatively small portion of the pressure applied by sleeve 30 will be transmitted to the roller bearings 23, 24. Thus, there is sufficient clearance between conventional roller bearing structures such as shown to allow the pressure of the high viscosity lubricant between core 10 and sleeve 30 to take up most of the pressure applied directly to the sleeve 30. However, if desired, the bearing structure 22, 23, 24, 33 may be replaced by a hydrostatic bearing such as shown in U.S. Patent No. 3,076,523, for example.

Figure 2:
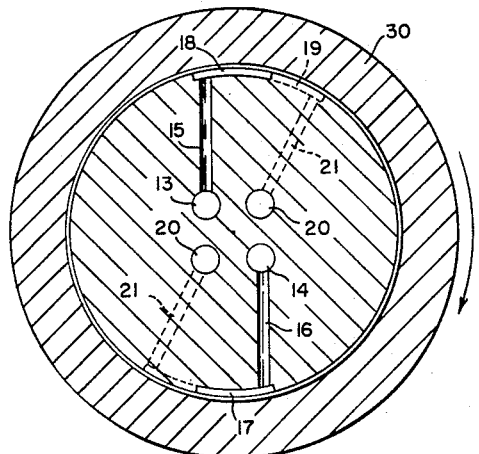
FIG. 2 is a cross-sectional view of the roll of FIG. 1 taken on line 2—2 of FIG. 1.

Various designs of the ports for transporting the viscous lubricant to the region between the core 10 and the sleeve 30 are possible. In FIG. 2 the ports are positioned to be particularly suitable when the sleeve 30 is rotated in the direction shown by the arrow, but the sleeve 30 can also be rotated in the opposite direction.

Figure 3:
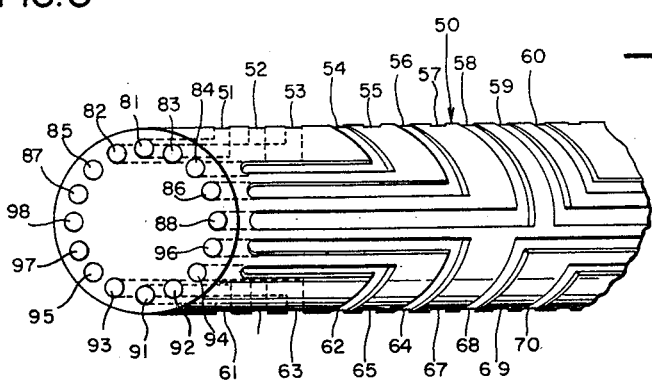
FIG. 3 is a view of an insert which may be added to the device of FIGS. 1 and 2.

FIG. 3 shows a portion of an insert (greatly enlarged in diameter) which can be fitted into the inlet openings 13 and 14 to provide for differential pressure along the length of the sleeve 30. Thus an insert 50 is fitted into an inlet 13 so that the exit openings or ports 51–60 connect with the ports 15 through the upper portion of cylinder 12 and the exit openings of ports 61–70 connect with ports 16 through the lower portion of cylinder 12. Separate fittings are provided for the ends of ports 81–88 and 91–98 so that the high pressure lubricant can be applied to said ports at different pressures. For example, where there is a tendency for the sleeve 30 to sag in the middle the pressure of the lubricant supplied to the fittings is progressively higher as one goes from port 81 to 88 and from port 91 to 98. The applied pressure differential is maintained in the region between cylinder 12 and sleeve 30 due to the characteristics of the high pressure lubricant; with a completely fluid lubricant such pressure would be substantially equal along the length of the sleeve.

Figure 4:
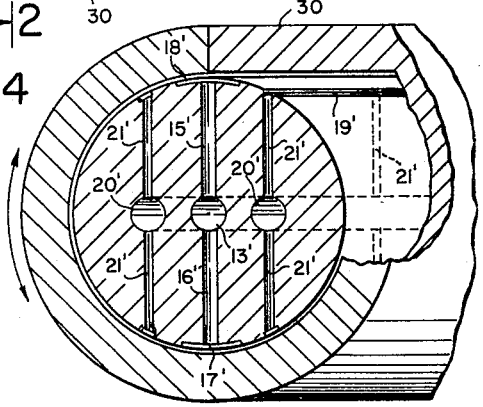
FIG. 4 is a cross-sectional view of a modified type of shaft and sleeve combination.
Figure 5:
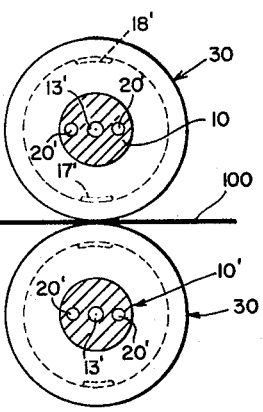
FIG. 5 is a somewhat diagrammatic view of a pair of rolls made according to the invention illustrating an important use of such rolls.

As already indicated various placements of the inlet and outlet ports and slots for the stationary shaft 10, 12 are possible. FIG. 4 shows one such alternative arrangement. In this device the stationary core member 12' has one axially extending inlet port 13' and two series of radial ports 15' and 16' connecting to said axially extending port 13'. Slots 17' and 18' are provided at the outlet of radial ports 16' and 15' respectively. The lubricant is collected in slots 19' and fed through radial slots 21' to the pair of outlet ports 20'. FIG. 5 illustrates how two such nipping devices can be employed in the rolling of a metal ribbon.

Figure 6:
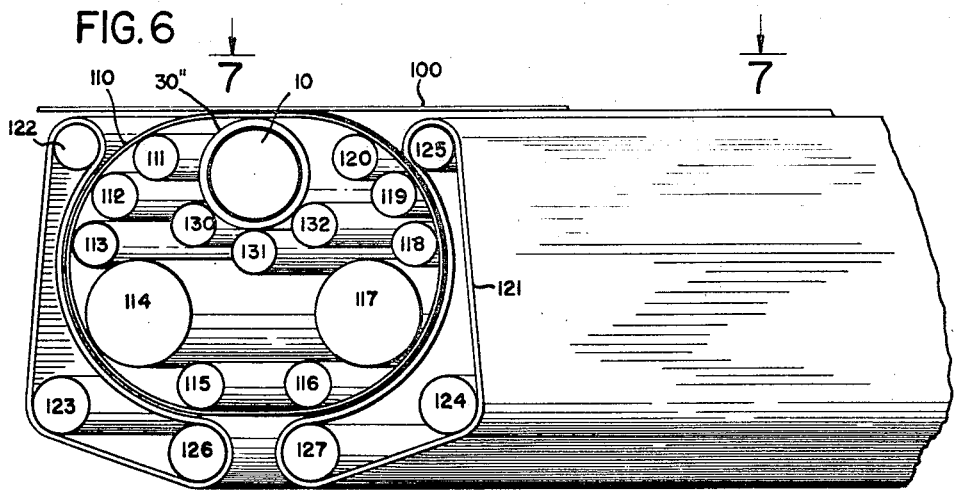
FIG. 6 is an end view of a modified form of device which incorporates the roll of the invention.
Figure 7:
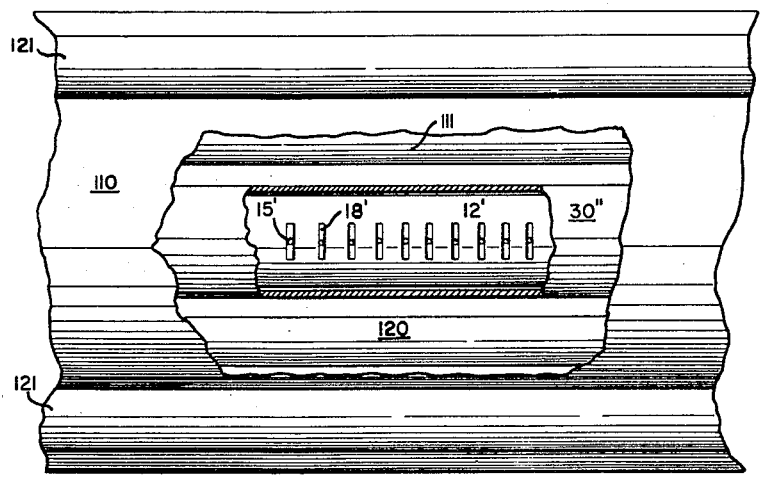
FIG. 7 is a top plan view, partly broken away, of the device of FIG. 7.

The device of the invention has many uses in addition to the rolling of metal strips and foils. For example, it can be employed in papermaking machines for pressing the water from a freshly formed paper matt, in felting machines, in plastic sheet-making or embossing machines, in laminating machines, etc. The outer surface of sleeve 30 may be applied directly to the material being treated as illustrated in FIG. 5 or a more complex arrangement may be employed wherein the roll applies pressure to an endless belt 110 which makes contact with the material being treated as illustrated in FIGS. 6 and 7. In these figures only the lower roll device is shown, it being understood that the upper roll may be a similar (looking glass image) of the lower roll device or a single roll pressing device. In FIG. 6 the sleeve roll 30" corresponds to the device of FIGS. 1, 2 or 4. Interposed between sleeve 30" and the material 100 which is being rolled, embossed or otherwise treated is the endless belt 110 which is supported from the inside by a series of idler rollers 111–120. The belt 110 is driven by a second belt 121 supported on rollers 122–125 and driven by one or both of rollers 126 and 127. Belt 110 can have a plain, polished or matt outer surface or may contain raised or depressed designs therein to impart to said material 100 being treated. In the device of FIGS. 6 and 7 the sleeve 30" can be driven by said belt 110 through belt 121 without the aid of a gear such as shown at 35 in FIG. 1. Rolls 130, 131 and 132 support the sleeve 30" when no lubricant pressure is applied.

The highly viscous grease or lubricant is supplied to the device under pressure by devices known in the art. For example, the mechanism disclosed in U.S. Patent Nos. 3,076,523 and 3,076,524 may be employed or other pressure applying devices such as employed for continuously extruding metals or plastics may be employed.

In operation, highly viscous grease is applied to a pair of rollers such as shown in FIG. 5 for rolling or drawing a metal strip 100. The pressure applied to decrease the thickness of the sheet 100 can be adjusted within certain limits by varying the pressure on the grease supplied to the rolls. By the addition of a device such as illustrated in FIG. 3, a variation of pressure may be applied to certain linear portions of the sheet 100. Very little leakage occurs adjacent the seals 32 and 34 of the device of FIG. 1 because before the lubricant reaches the areas of these sleeves it has been withdrawn through slots 19 and ports 20 and 21 and because the high pressure on the lubricant in the zone beneath sleeve 30 is dissipated to a relatively low pressure by the time that the lubricant which escapes slots 19 reaches said area of the seals.

The features and principles underlying the invention described above in connection with specific exemplifications will suggest to those skilled in the art many other modifications thereof. It is accordingly desired that the appended claims shall not be limited to any specific feature or details thereof.

I claim:

1. In a roll type of device for applying dynamic rolling pressure with the aid of another roll device to continuous sheet material, the improvement comprising a stationary core, a rotatable sleeve extending over an intermediate portion of the core, means to mount the stationary core at the ends beyond the limits of said rotatable sleeve, said stationery core having an enlarged intermediate cylindrical portion extending short of the internal diameter of said sleeve, said rotatable sleeve having means adjacent the ends thereof extending over the ends of the enlarged cylindrical portion of said core, said core comprising a first conduit system for continuously supplying high viscosity lubricant under pressure to the region between the sleeve and the enlarged cylindrical portion of the core, said first conduit system comprising longitudinal passages for introducing high pressure lubricant from an end of the core and a plurality of branch passages for leading said lubricant to various areas along the surface of said core, whereby said sleeve may be readily rotated on the film of said lubricant formed between the sleeve and the enlarged portion of the core, and said core also comprising a second conduit system similar to the first conduit system for continuously withdrawing lubricant from the surface of said enlarged cylindrical portion of said core.

2. The roll type of device as claimed in claim 1 comprising means on the sleeve adapted to rotate the same.

3. The roll type of device as claimed in claim 1 comprising a pair of bearing devices provided adjacent the ends of the enlarged cylindrical portion of the core between said core and said sleeve.

4. The device as claimed in claim 1 in combination with external endless belt means, said endless belt being mounted so as to pass over a surface of said roll means, a second belt means mounted to rotate said first belt means and said roll means while leaving exposed the portion of the first belt means which passes over the roll means.

5. The roll type of device as claimed in claim 1, wherein said first conduit system comprises a plurality of longitudinal passages extending from ends thereof each having a branch extending to the surface of the core in a predefined area thereof, whereby variations in pressure can be applied to the sleeve along the length thereof.

References Cited

UNITED STATES PATENTS

| | | | |
|---|---|---|---|
| 2,566,679 | 9/1951 | Sendzimir et al. | 72—45 |
| 2,908,964 | 10/1959 | Appenzeller | 29—110 |
| 3,023,695 | 3/1962 | Kuster | 100—170 |
| 3,070,872 | 1/1963 | Ulrichs et al. | 29—113 |
| 3,119,324 | 1/1964 | Justus | 29—116 |
| 3,290,897 | 12/1966 | Kuehn | 29—116 |

FOREIGN PATENTS 1,349,69   12/1963   France.

CHARLES W. LANHAM, *Primary Examiner.*

E. M. COMBS, *Assistant Examiner.*